No. 663,809. Patented Dec. 11, 1900.
C. G. HOERLE.
TRUCK FOR ROLLER SKATES.
(Application filed Oct. 17, 1900.)
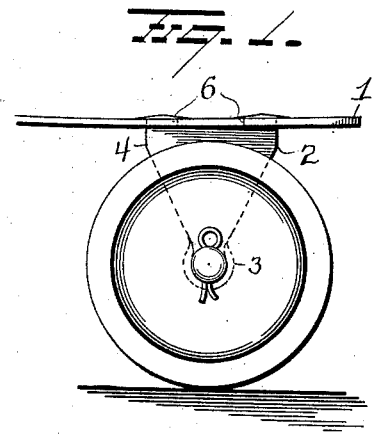
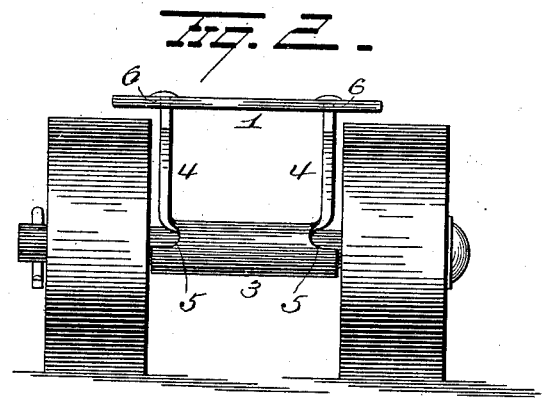
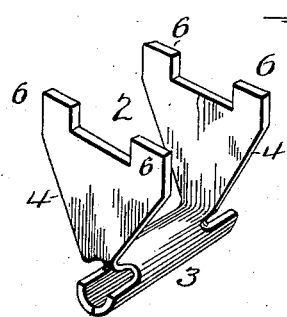
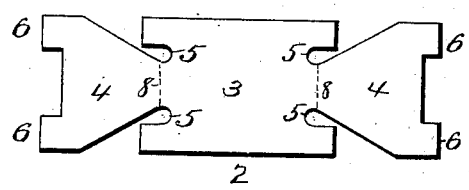
WITNESSES
INVENTOR

UNITED STATES PATENT OFFICE.

CHRISTIAN G. HOERLE, OF TORRINGTON, CONNECTICUT, ASSIGNOR TO THE UNION HARDWARE COMPANY, OF SAME PLACE.

TRUCK FOR ROLLER-SKATES.

SPECIFICATION forming part of Letters Patent No. 663,809, dated December 11, 1900.

Application filed October 17, 1900. Serial No. 33,366. (No model.)

*To all whom it may concern:*

Be it known that I, CHRISTIAN G. HOERLE, a resident of Torrington, in the county of Litchfield and State of Connecticut, have invented certain new and useful Improvements in Trucks for Roller-Skates; and I do hereby declare the following to be a full, clear, and exact description of the invention, such as will enable others skilled in the art to which it appertains to make and use the same.

My invention relates to an improved truck for roller-skates, the object of the invention being to provide an improved truck which can be formed from a single blank of sheet metal and which will be extremely simple in construction, cheap to manufacture, and strong and durable when in use.

With this object in view the invention consists in certain novel features of construction and combinations and arrangements of parts, as will be more fully hereinafter described, and pointed out in the claims.

In the accompanying drawings, Figure 1 is a side view illustrating my improvements secured in position on a skate. Fig. 2 is a front view of the same. Fig. 3 is a perspective view of the truck detached, and Fig. 4 is a view showing the blank from which the truck is made.

1 represents the foot-supporting plate of a skate, and 2 my improved truck secured thereto. The truck 2 is formed from a single integral sheet-metal blank of the shape shown in Fig. 4, or, in other words, a blank having a central approximately rectangular portion 3 and approximately triangular end sections 4 on diametrically opposite ends of the central portion 3, which latter is recessed or notched on opposite sides of the juncture of the end sections, as shown at 5, for a purpose which will hereinafter appear. The end sections 4 are widest at their outer ends and are made with tongues or lugs 6, adapted to be upset to secure them in holes in the plate 1 and the truck in place.

In forming the truck from the blank the central portion 3 is bent into cylindrical or tubular shape to form a bearing-sleeve for the axle, and the end sections 4 are bent on the line 8 at right angles to the tubular bearing-sleeve, the notches or recesses 5 permitting the end sections to be bent on line 8, so as to dispose the end sections in a vertical plane inside that of the ends of the tubular sleeve when the truck is in shape for use, as shown in Fig. 3.

When my improvements are in position on a skate, the end sections 4 rigidly support the bearing-sleeve in a horizontal position, and the axle carrying the rollers is revolubly mounted in said sleeve.

If my improved truck is to be employed on a skate having a wooden foot-support, the lugs 6 can be first secured in a plate and the latter secured to the foot-support by screws, or the bent portions can be bent over and secured directly to the foot-support by screws.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A truck for roller-skates comprising a sheet-metal blank bent to form a bearing-sleeve and an upwardly-projecting arm or support at each end thereof, the flat faces of said arms or supports being opposite to each other.

2. A truck for a roller-skate, comprising a sheet-metal blank bent to form a bearing-sleeve having a closed upper face and integral arms or supports at respective ends of said sleeve.

3. A truck for a roller-skate, comprising a single piece of sheet metal having a portion bent to form a bearing-sleeve with the meeting edges of the metal forming the sleeve, below the top face of said sleeve and integral flat arms or supports projecting upwardly from the ends of the top portion of the sleeve.

4. A truck for roller-skates comprising a sheet-metal blank bent to form a bearing-sleeve and a support at each end thereof having its outer face at right angles to the axis of the sleeve and in a vertical plane inside that of the ends of the sleeve.

5. The herein-described sheet-metal blank for the purpose set forth, comprising an approximately rectangular central portion, an approximately triangular section at each end of the central portion and said central portion provided with notches or recesses at opposite sides of the juncture of the triangular sections.

In testimony whereof I have signed this specification in the presence of two subscribing witnesses.

CHRISTIAN G. HOERLE.

Witnesses:
  F. T. SPIELKAN,
  WM. H. BRONSON.